No. 883,106. PATENTED MAR. 24, 1908.
C. C. GALLOWAY.
DENTAL APPLIANCE.
APPLICATION FILED JULY 22, 1907.
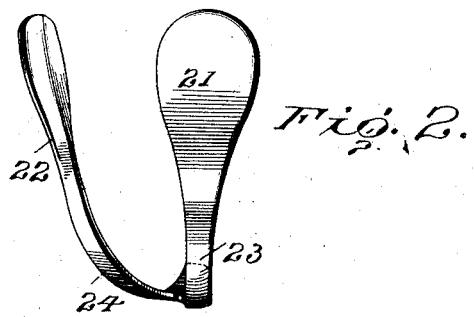
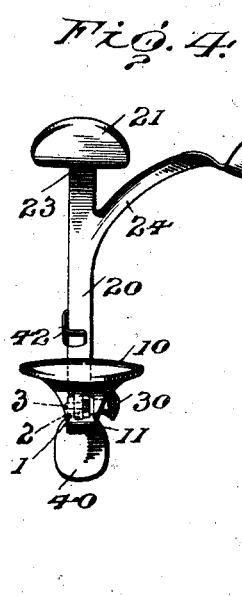
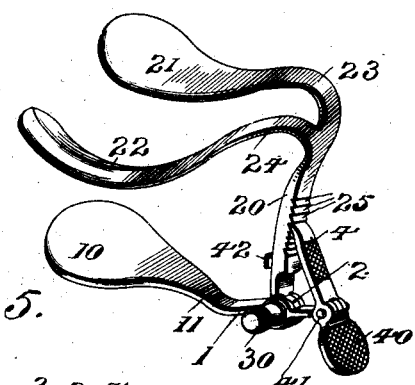
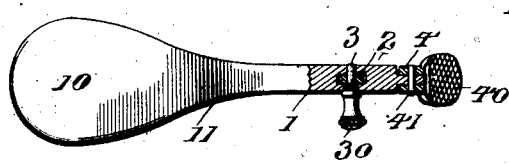
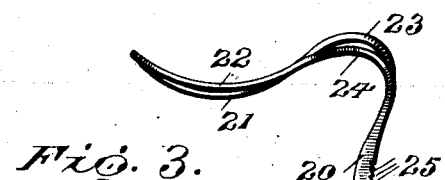
Witnesses
W. A. Williams
E. R. Peck
Inventor
C. C. Galloway.
By Hubert T. Peck
Attorney

UNITED STATES PATENT OFFICE.

CHARLES C. GALLOWAY, OF WASHINGTON, DISTRICT OF COLUMBIA.

DENTAL APPLIANCE.

No. 883,106.  Specification of Letters Patent.  Patented March 24, 1908.

Application filed July 22, 1907. Serial No. 384,992.

*To all whom it may concern:*

Be it known that I, CHARLES C. GALLOWAY, a citizen of the United States, residing at Washington city, District of Columbia, have invented certain new and useful Improvements in Dental Appliances; and I do hereby declare the following to be a full, clear, and exact description of the invention, such as will enable others skilled in the art to which it appertains to make and use the same.

This invention relates to certain improvements in dental appliances employed in connection with dental operative work, and relates more particularly to dental roll holders and shields; and the objects and nature of my invention will be readily understood by those skilled in the art in the light of the following explanation of the structure shown in the accompanying drawings as my preferred embodiment from among other arrangements within the spirit and scope of my invention as hereinafter defined.

My invention consists in certain novel features in construction and in arrangements and combinations as hereinafter described and set forth.

Referring to the accompanying drawings: Figure 1, is a perspective view of the appliance. Fig. 2, is a top plan view of the mouth member thereof. Fig. 3, is an edge elevation. Fig. 4, is a front elevation. Fig. 5, is a sectional view taken on the line 5—5, Fig. 3.

The appliance consists of a chin spoon or member, a mouth or combined cheek and tongue member, and a locking dog or pawl. Each one of said members is preferably formed in one stiff piece of suitable metal or other desirable material.

The chin member consists of the shank 1, forming a rearward longitudinal continuation of the enlarged chin engaging plate or spoon 10, preferably having a slightly rounded or convexed upper surface to engage the under surface of the chin, while the shank 1, intermediate its length or about at the junction with the spoon 10, is bowed or deflected downwardly at 11, to drop below the lower jaw bone.

At a point, a distance forwardly from its rear end the shank 1, is formed with a mortise extending vertically therethrough to loosely receive the reduced lower end or tenon 2, of the upwardly extending shank 20, of the mouth member. The chin and mouth members are pivotally joined to permit their free ends to approach and recede, by a pivot pin 3, passed transversely through the shank 1, and said reduced end 2. If so desired this pivot pin can be removable and be provided with an end head 30, whereby the mouth member can be removed should it be desired to use right and left hand mouth members with the one chin member. If desired, however, the appliances can be made complete as rights and lefts.

The shank 20, extends upwardly for a suitable distance and at its upper end is forked or branched to form a forwardly projecting tongue holding spoon 21, and a diverging and forwardly extending cheek holding arm 22. The free end portions of said tongue and arm are spaced the necessary distance apart to receive a row of lower jaw teeth and to hold rolls of absorbent cotton or other suitable material on both sides of the teeth and gums while the arm 22, holds the cheek pressed outwardly from the teeth and the spoon 21, holds the tongue down and from interfering with the absorbent material or with the operative work on one or more of the teeth exposed. The spoon at its rear or outer end is bulged or deflected upwardly at 23, to pass up over the lower lip and teeth, while the arm 22, extends forwardly and laterally from the shank at an angle, and curves upwardly at 24, to pass over the lip and down into the mouth between the lip and cheek and the lower teeth or gums.

At its rear longitudinal edge and intermediate its length, the shank 2, is formed with a longitudinal series of downwardly inclined ratchet teeth or shoulders 25, to engage the toothed or shouldered free upper end of the locking dog or pawl 4, arranged longitudinally of and beyond the outer vertical edge of the stem 2, and at its lower free end formed with a thumb piece 40. Intermediate its length, the dog is mounted on and carried by the rearwardly projecting end of the shank of the chin spoon. In the specific example illustrated, I show the dog formed with a transverse mortise or slot loosely receiving the reduced outer extremity of said shank, the dog being pivotally joined to said end by a transverse pivot pin 41, so that its upper free end can swing toward and from the shank of the mouth member and into and out of engagement with the ratchet teeth.

The upper free end of the dog is formed with a rearwardly extending arm 42, having its free end bent behind the rear or inner vertical edge of the shank of the mouth member to cause said member to swing outwardly with the dog and yet so as to permit a certain limited free swinging movement of the upper end of the dog independently of the said mouth member.

The arrangement is such that the operator, holding the appliance in one hand, can by the thumb swing the mouth member rearwardly or forwardly to close or open the device or adjust it to the desired position, and the dog engaging the ratchet teeth will lock the device in the desired position. By swinging the upper end of the dog forwardly with the thumb it will press against the mouth member and swing the same forwardly, the dog slipping down over the ratchet teeth, and by pressing the projecting lower end or thumb piece of the dog forwardly, the upper end of the dog swinging rearwardly or outwardly will through the medium of arm 42, swing the mouth member outwardly.

The device is exceedingly strong and durable being composed of only three parts excepting pivots, and as these three parts can each be made in one piece, the device can be economically manufactured. The device by reason of the relative arrangement of the dog and mouth and chin members can be very easily, conveniently and quickly applied and released without discomfort to the patient, and by reason of the formation of the mouth piece shank with diverging branches forming the cheek arm and tongue spoon, the rolls can be held and the teeth properly exposed and kept dry easily and efficiently and without annoyance or discomfort to the patient.

What I claim is:—

1. A dental appliance, substantially as described, comprising a chin spoon having an outwardly extending shank, a mouth member having an upwardly extending shank at its lower end pivoted to said chin spoon shank intermediate the length thereof, and a vertically disposed dog for locking said mouth piece and fulcrumed between its ends to the outer end of said chin spoon shank.

2. A dental appliance, substantially as described, comprising a chin spoon having an outwardly extending shank, a swinging mouth member fulcrumed to said shank and having a longitudinal series of ratchet teeth, and a dog arranged longitudinally of and outwardly beyond said member and at its free upper end arranged to engage said ratchet teeth, said dog being fulcrumed intermediate its length to said shank and having a depending thumb piece.

3. A dental appliance, substantially as described, comprising a chin member, a swinging mouth member fulcrumed to said chin member and having a series of ratchet teeth, and a vertically disposed locking dog arranged longitudinally of and outwardly beyond said mouth member and fulcrumed to said chin member and at its free upper end arranged to engage said teeth and having an arm lapping behind said mouth member and at its lower end having a thumb piece.

4. A dental appliance of the character substantially as described, comprising a chin spoon having a shank, a mouth member composed of a shank pivotally joined to said chin spoon shank and at its upper end forked and forming forwardly extending diverging tongue spoon and cheek arm, and a dog.

In testimony whereof I affix my signature, in presence of two witnesses.

CHAS. C. GALLOWAY.

Witnesses:
JESSE B. SCHAFHIRT,
P. H. MOORE.